United States Patent [19]
Richards

[11] Patent Number: 5,389,249
[45] Date of Patent: Feb. 14, 1995

[54] CLARIFIER WITH ROTATING SEALED COVER

[75] Inventor: John Richards, London, England

[73] Assignee: Dorr-Oliver Incorporated, Milford, Conn.

[21] Appl. No.: 159,845

[22] Filed: Dec. 1, 1993

[51] Int. Cl.$^6$ .............................................. B01D 21/06
[52] U.S. Cl. .................... 210/188; 210/520; 210/528; 210/530; 210/539
[58] Field of Search ............... 210/520, 523, 525, 528, 210/530, DIG. 9, 539, 188

[56] References Cited

U.S. PATENT DOCUMENTS

| | | | |
|---|---|---|---|
| Re. 27,000 | 12/1970 | Klopper | 259/108 |
| 2,713,027 | 7/1955 | Binford | 210/3 |
| 3,279,606 | 10/1966 | Cox | 210/539 |
| 3,282,425 | 11/1966 | Christiani | 210/83 |
| 3,314,547 | 4/1967 | Kivell | 210/525 |
| 3,437,212 | 4/1969 | Thorn et al. | 210/525 |
| 3,616,910 | 11/1971 | Gericke | 210/83 |
| 3,890,231 | 6/1975 | LaClair et al. | 210/199 |
| 4,451,373 | 5/1984 | Thayer | 210/621 |
| 4,994,182 | 2/1991 | Noiron et al. | 210/528 |
| 5,227,071 | 7/1993 | Torline et al. | 210/651 |

OTHER PUBLICATIONS

"We Cover the World", Rubb Buildings Limited Brochure Printed in England–Nov. 1992.
"Aform Covers the Water Industry", Aform Limited Brochure.

*Primary Examiner*—Christopher Upton
*Attorney, Agent, or Firm*—DeLio & Peterson

[57] ABSTRACT

A clarifier comprising a tank, a feedwell, a cover and a raking structure. The cover is rotatably and sealingly engaged with the tank so as to prevent foul air within the tank from escaping into the atmosphere. The feed well and the raking structure are supported by and rotatable with the cover. The clarifier further includes a drive means for rotating the cover.

12 Claims, 7 Drawing Sheets

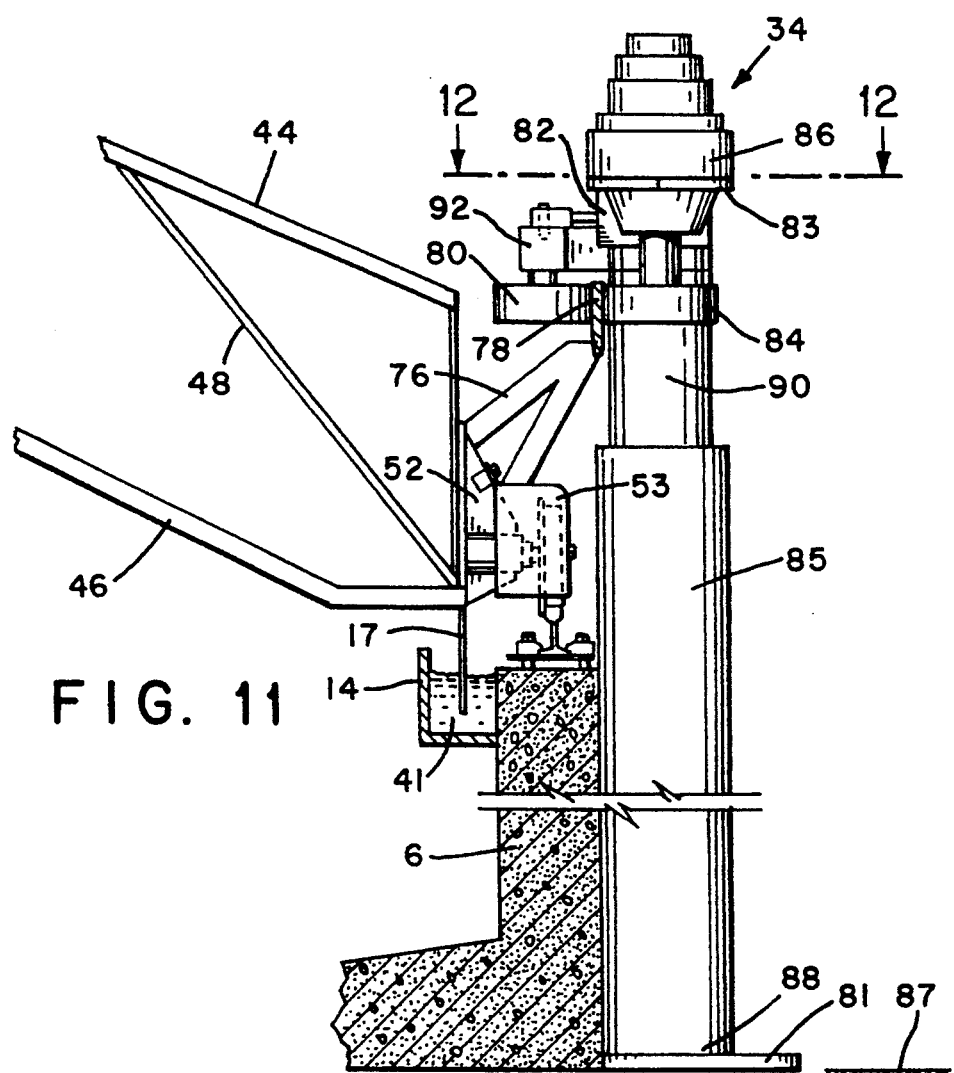
FIG. 11
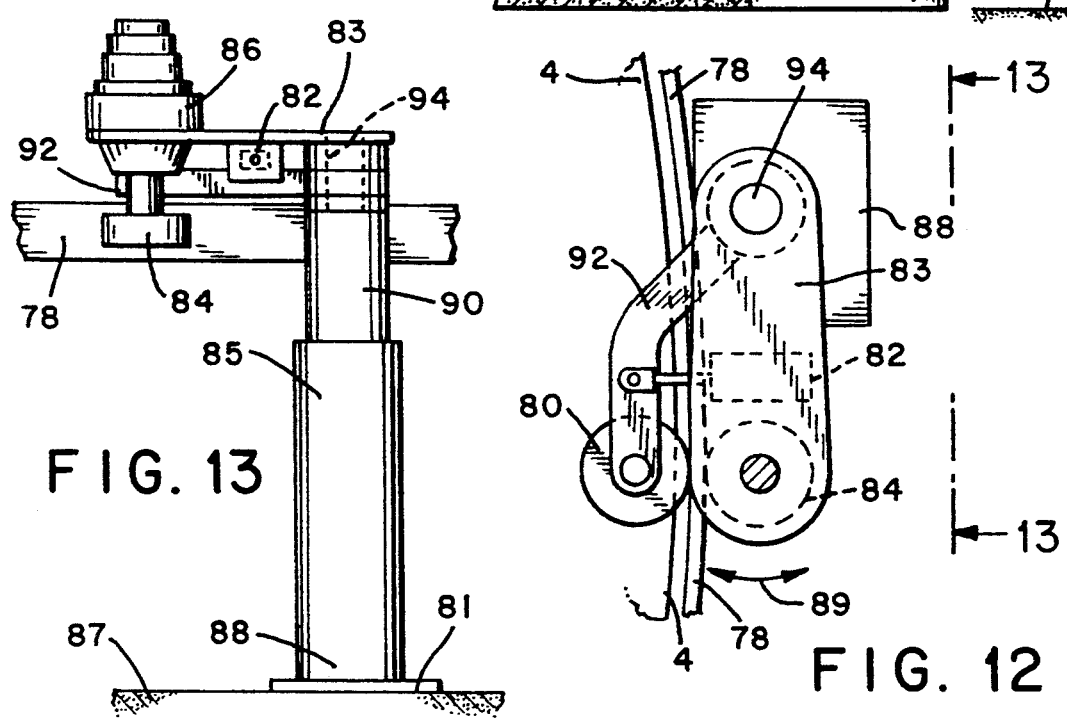
FIG. 13
FIG. 12

CLARIFIER WITH ROTATING SEALED COVER

BACKGROUND OF THE INVENTION

1. Field of the Invention

The present invention is directed to clarifiers and more particularly, to a clarifier that utilizes a rotating cover sealingly engaged to the clarifier tank so as to eliminate foul air contamination of the environment.

2. Description of Related Art

Growing environmental awareness and environmental laws and regulations have lead to an increasing demand for enclosure and treatment of obnoxious or foul smells and odors in order to prevent these smells or odors from permeating the surrounding environment or atmosphere. Such environmental awareness, laws and regulations have had a serious impact on many industries.

Clarifiers are typically utilized in many industrial processes. A clarifier is a continuously operating, mechanically cleaned sedimentation device. Sedimentation is the process of subsidence and deposition of suspended matter carried by water, wastewater, or other liquids, by gravity. Feed is piped into an influent well which is semi-submerged and centrally positioned within a tank. The influent may be a liquid, slurry or other form of input material to a process or specific unit operation. Feed then flows outward to the periphery of the tank where effluent, i.e. any stream flowing out from a plant, process, basin or treatment device, is collected in a continuous peripheral launder or an open chute or trough for conveying solids, liquids or solutions by gravity. Settled solids are raked toward the center of the tank and into a discharge sump. Conventional traction clarifiers normally consist of a traction bridge which spans from a support member positioned in the center of the tank to the tank periphery and supports a raking mechanism, the influent well and a drive mechanism. The center support member consist of a tripod-like structure positioned upon the tank floor. The bridge is supported on a center bearing mounted on the top of the tripod-like structure. The end of the bridge adjacent the tank periphery is supported on a traction carriage. A drive mechanism, typically a geared motor, drives one of the traction wheels so as to rotate the bridge and raking mechanism. Power to the drive mechanism is supplied by a contactor column that is situated above the center bearing. A power supply cable is typically disposed beneath the tank floor and within the center bearing and contactor column. It has been found that due to the presence of the rotating traction bridge and the traction carriage, it is difficult to sufficiently cover the tank so as to prevent the foul or obnoxious air within the tank from contaminating or escaping into the surrounding environment or atmosphere.

Bearing in mind the problems and deficiencies of the prior art, it is therefore an object of the present invention to provide a new and improved clarifier that utilizes a rotating tank cover that prevents foul air within the tank from contaminating the surrounding environment and/or atmosphere and eliminates the need for the rotating traction bridge, tripod, central contactor column and associated center bearing.

It is another object of the present invention to provide a new and improved clarifier that can be manufactured at a reasonable cost.

SUMMARY OF THE INVENTION

The above and other objects, which will be apparent to those skilled in the art, are achieved in the present invention which is directed to an apparatus for clarifying liquor, comprising a tank, a cover positioned over the tank wherein the cover is rotatably and sealingly engaged with a marginal wall of the tank so as to prevent foul air within the tank from escaping into the atmosphere. The clarifier further includes an air inlet means on the cover, an influent supply means disposed within the tank wherein the supply means is rotatable with and supported by the cover, means on the tank for extracting foul air from within the tank, means on the tank for filtering the foul air extracted from within the tank, means for rotating the cover, and a plurality of rakes supported by and rotatable with the cover for raking settled solids toward the center of the tank and into a sediment discharge sump of the tank.

In another aspect, the present invention is directed to an apparatus for clarifying liquor, comprising, a tank, a cover positioned over the tank wherein the cover is rotatably and sealingly engaged with a marginal wall of the tank so as to prevent foul air within the tank from escaping into the atmosphere, an air inlet on the cover, a feed well disposed within the tank wherein the feed well is rotatable with and supported by the cover, a foul air extractor on the tank for extracting foul air from within the tank, at least one filter for filtering the foul air extracted from the tank, a drive mechanism for rotating the cover, and a plurality of rakes supported by and rotatable with the cover for raking settled solids toward the center of the tank and into a sediment discharge sump of the tank.

BRIEF DESCRIPTION OF THE DRAWINGS

FIG. 1a is an enlarged sectional view of the seal configuration depicted in FIG. 1.

FIG. 11 is a front elevational view of the drive mechanism utilized by the clarifier of the present invention.

FIG. 12 is a top plan view taken along line 12—12 of FIG. 11.

FIG. 13 is a side elevational view taken along line 13—13 of FIG. 12.

DESCRIPTION OF THE PREFERRED EMBODIMENTS

Figure 1:
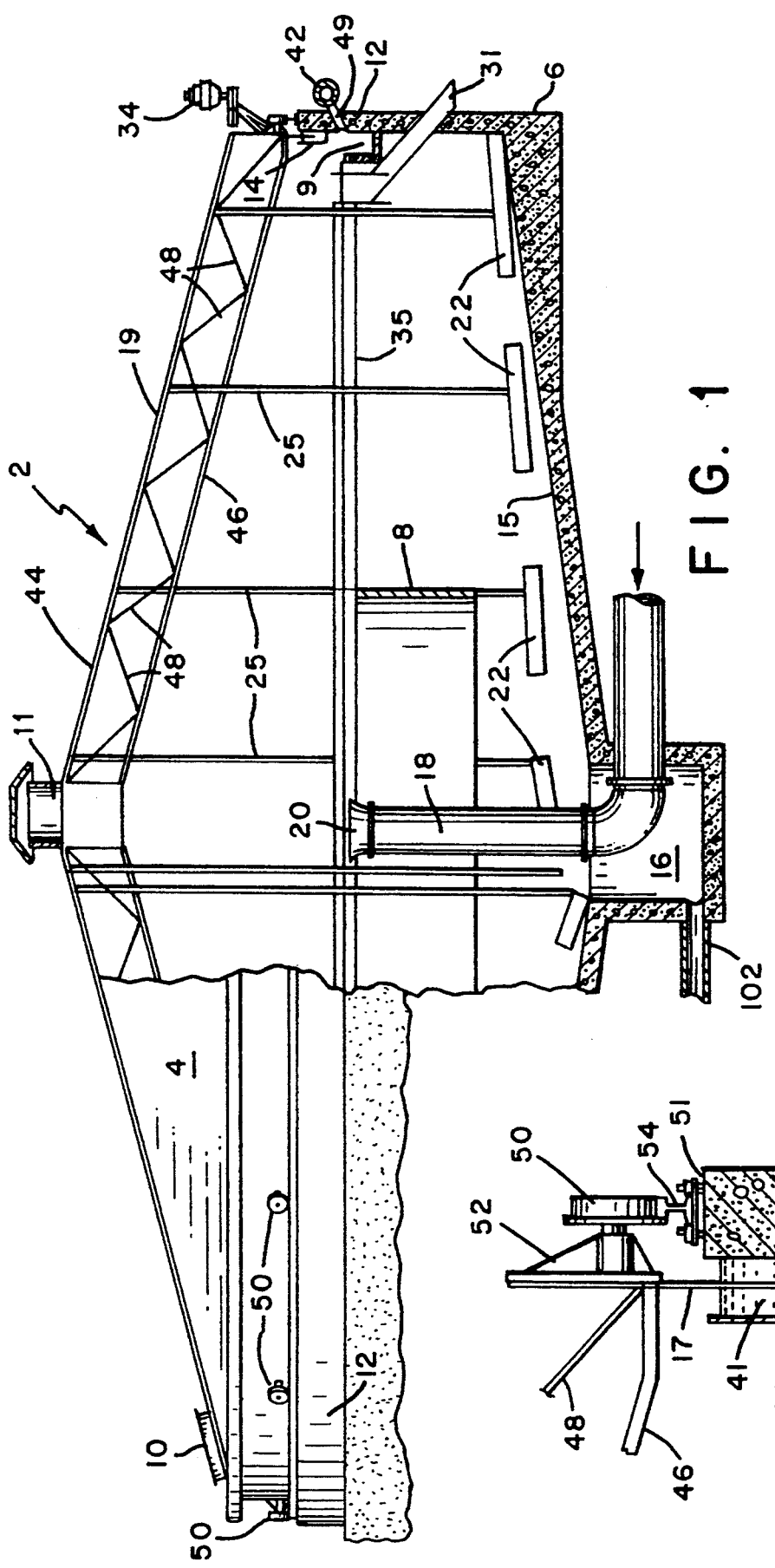
FIG. 1 is an elevational view partly in section of the clarifier of the present invention.
Figure 8:
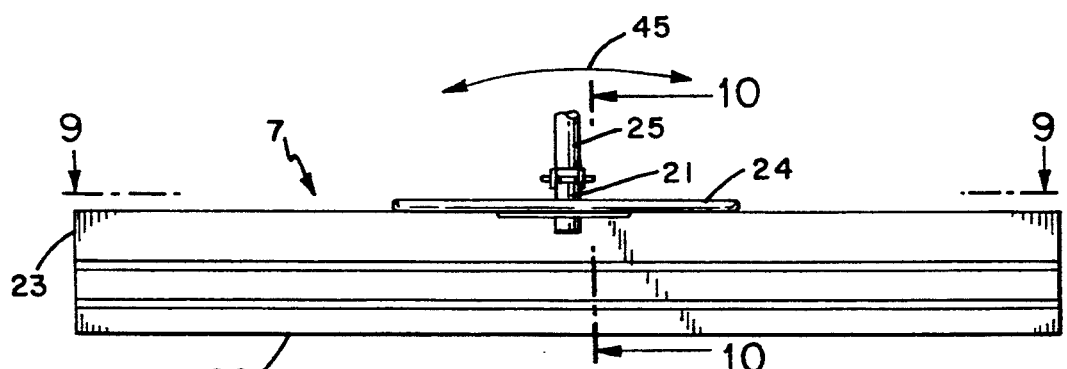
FIG. 8 is a front elevational view of the raking structure utilized by the clarifier of the present invention.
Figure 9:
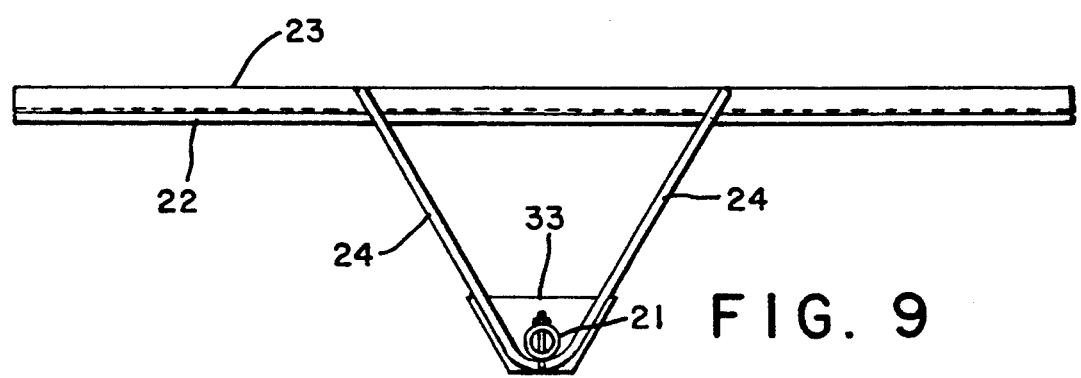
FIG. 9 is a top plan view taken along line 9—9 of FIG. 8.
Figure 10:
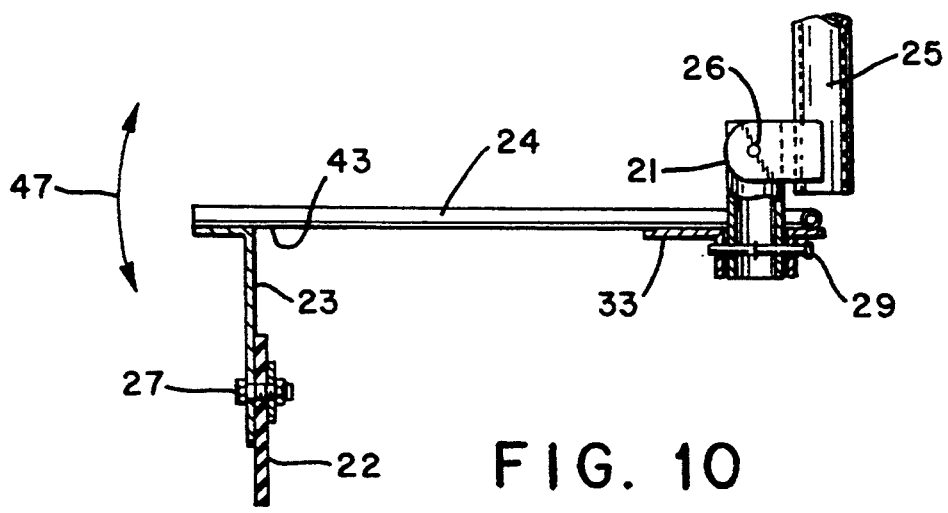
FIG. 10 is a sectional view taken along line 10—10 of FIG. 8.

Referring to FIG. 1, clarifier 2 of the present invention consists generally of rotatable cover 4, circular-shaped tank 6, feed well 8 and raking structures 7 (see FIGS. 8-10). Tank 6 is fabricated from concrete and has cylindrically shaped wall 12 which is provided with peripheral overflow launder 9, and bottom 15 presenting a shallow inverted conical settling surface. Feed well 8 is centrally positioned within tank 6 and receives raw feed liquor from opening or outlet 20 of influent feed conduit 18. The influent raw feed liquor gravitates downwardly in feed well 8 so that the solids settle on bottom 15 of tank 6 while the liquid effluent flows out, upwardly and around feed well 8 for discharge from tank 6 through conduits (not shown). The function of feed well 8 is adequately described in commonly assigned U.S. Pat. Nos. 2,713,027 and 3,282,425, the disclosures of which are herein incorporated by reference. Scum blade 35 is attached to and rotates with feed well 8 and is supported by cover 4 via vertical support members 25. Scum blade 35 skims the surface of the liquid in tank 6 in order to transport floating matter or debris to scum box 28 (see FIG. 2). Scum blade 35 collects debris or matter floating on the surface of the liquid in feed well 8. Scum box 28 collects such floating debris or matter. Scum discharge port 31 is fluidly attached to scum box 28 and discharges the floating matter or debris from scum box 28.

Figure 2:
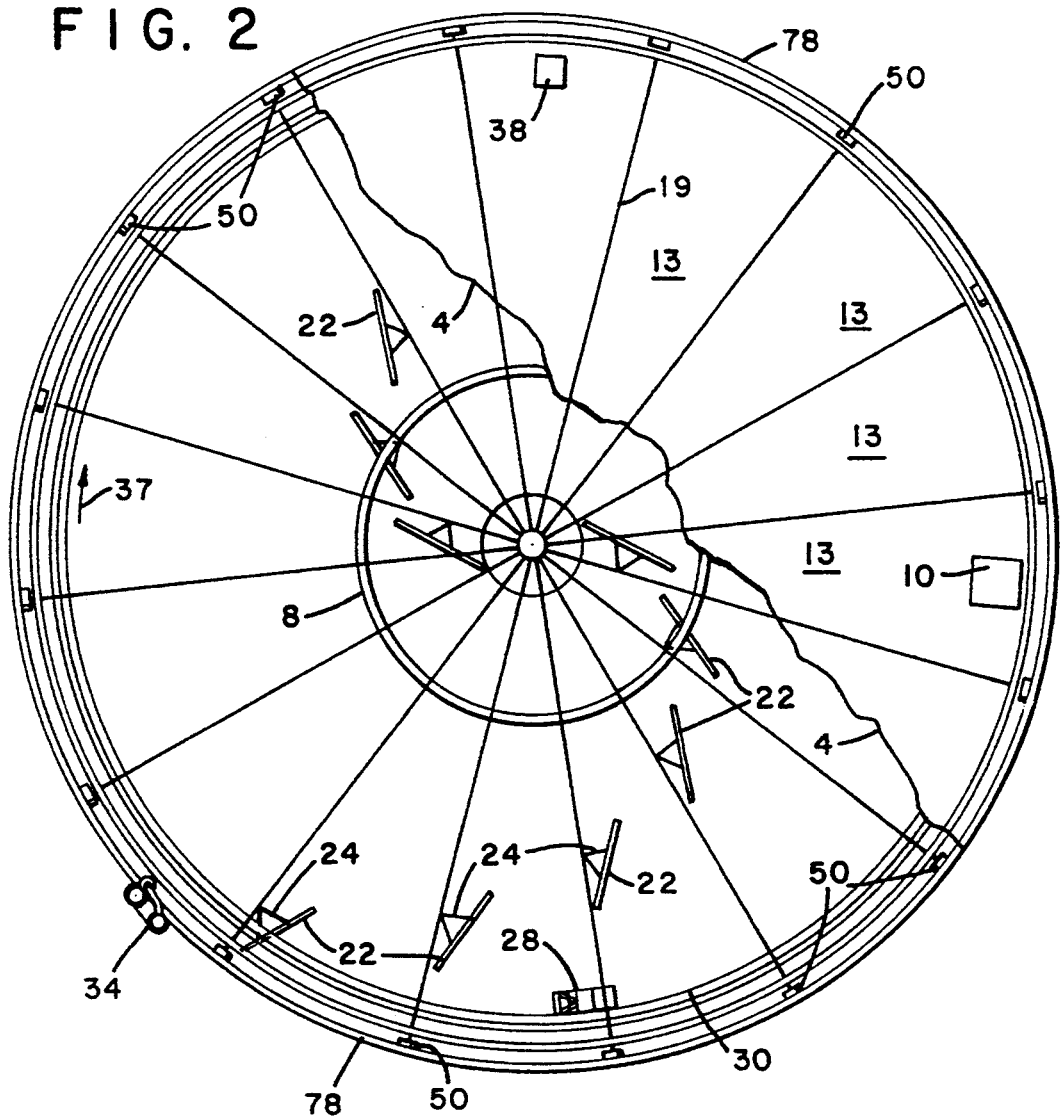
FIG. 2 is a top plan view of the clarifier of the present invention.

Referring to FIGS. 1 and 2, dome-shaped cover 4 is comprised of sections 13 radially extending from the center of the tank. In a preferred embodiment, cover 4 is comprised of sixteen (16) sections 13 which are connected to one another by corresponding radially extending support trusses 19 positioned intermediate any pair of sections 13. Trusses 19 are structurally hollow and are fabricated from metal. Sections 13 are heat welded to support trusses 19 so as to allow for low-level negative pressure on the inside of cover 4. Referring to FIG. 1, each truss 19 is comprised of outer layer 44, inner layer 46 and structural support members 48 which are intermediate layers 44 and 46. A galvanized coating is applied to each section 19 so as to prevent deterioration. Sections 13 are covered with high tenacity PVC (polyvinylchloride) fabric so as to prevent foul air within the tank from penetrating the cover in the area of the joints formed by sections 13 and corresponding radially extending support trusses 19. In an alternate embodiment, cover 4 is fabricated from glass reinforced plastic. Referring again to FIG. 2, access hatch 10 provides a means of entry into tank 6 for maintenance and repairs. Viewing port 38 allows for observation of raking structures 7 and the other aforementioned components during operation of clarifier 2.

Figure 3:
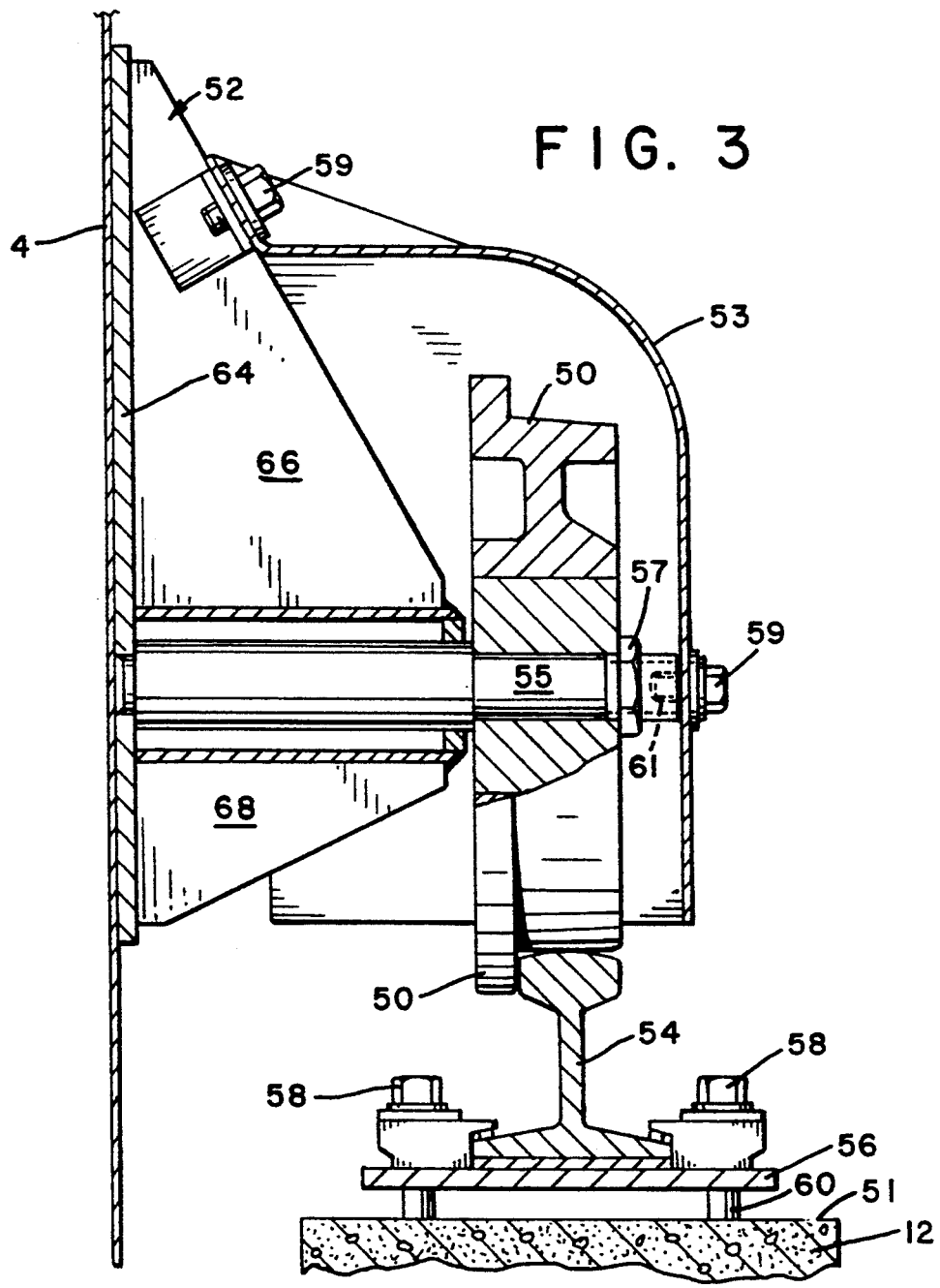
FIG. 3 is a side elevational view of the carriage wheel assembly utilized by the clarifier of the present invention.
Figure 4:
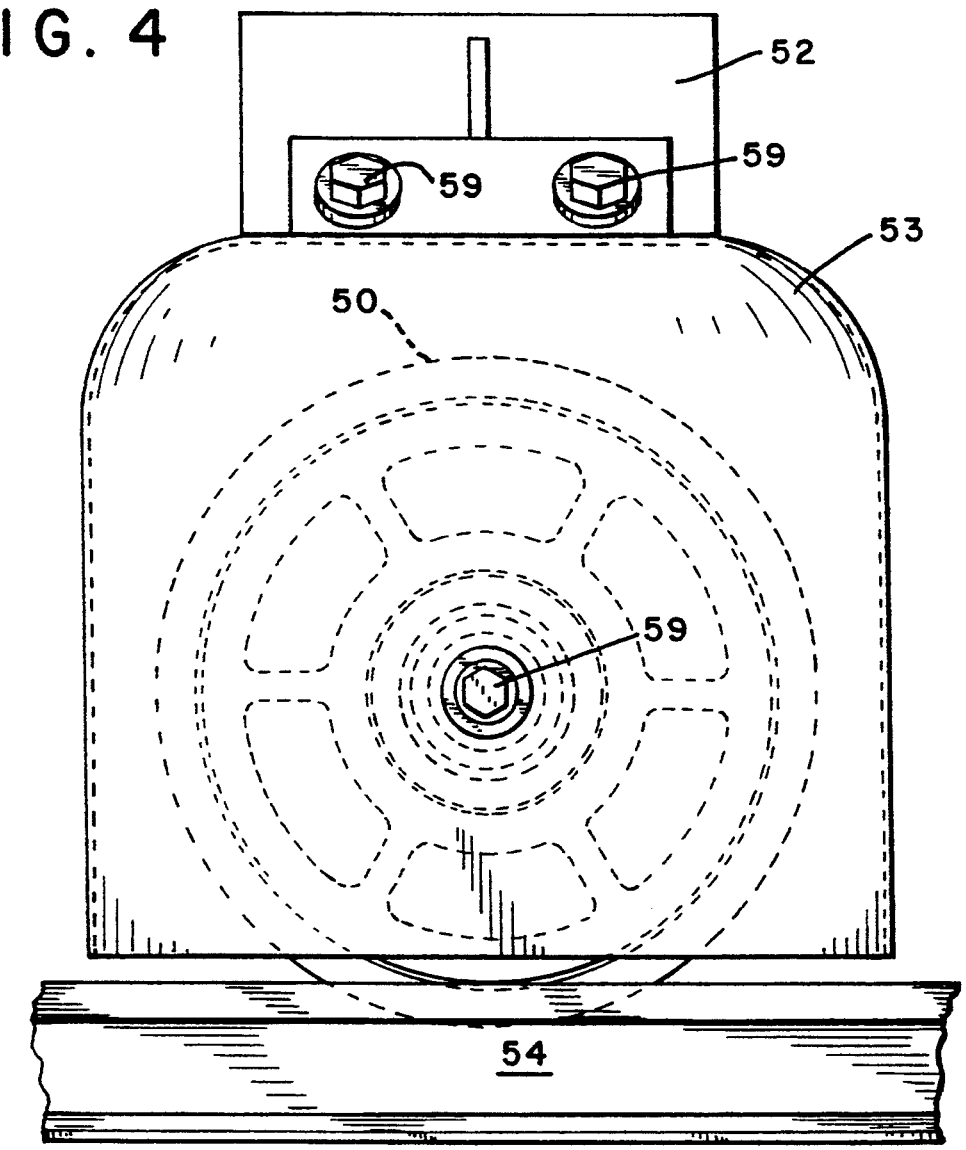
FIG. 4 is a front elevational view of the carriage wheel assembly depicted in FIG. 3 showing the carriage wheel in phantom.
Figure 5:
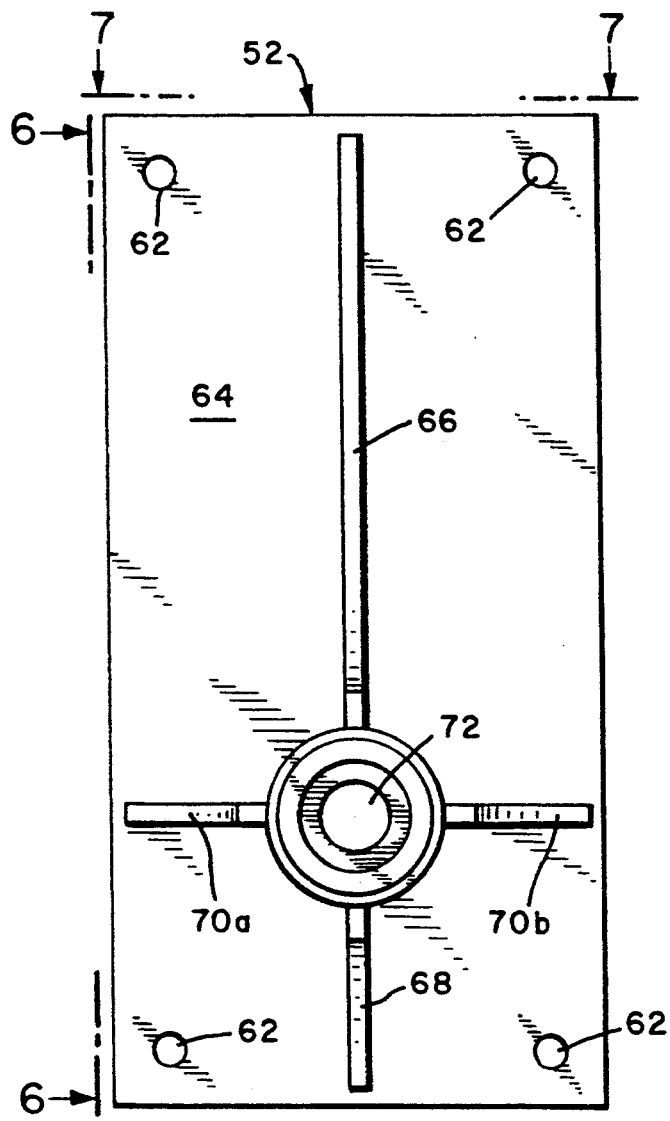
FIG. 5 is a front elevational view of the carriage wheel axle support bracket of the carriage wheel assembly depicted in FIG. 3.
Figure 6:
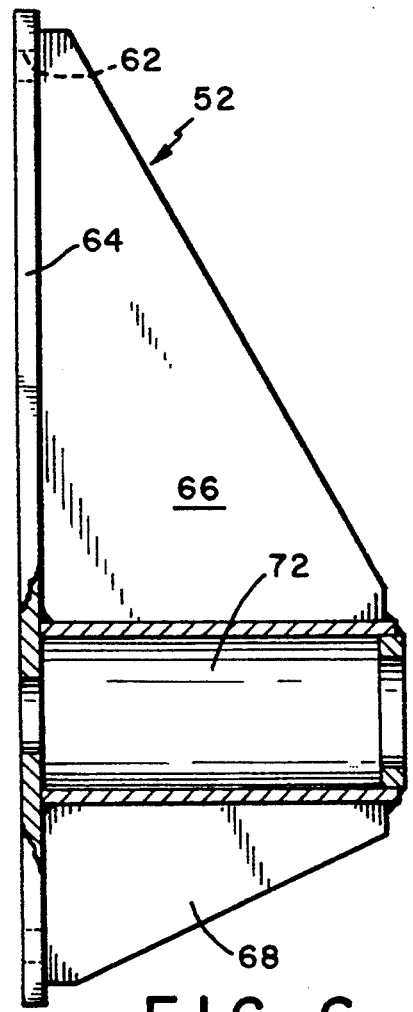
FIG. 6 is a side elevational view taken along line 6—6 of FIG. 5.
Figure 7:
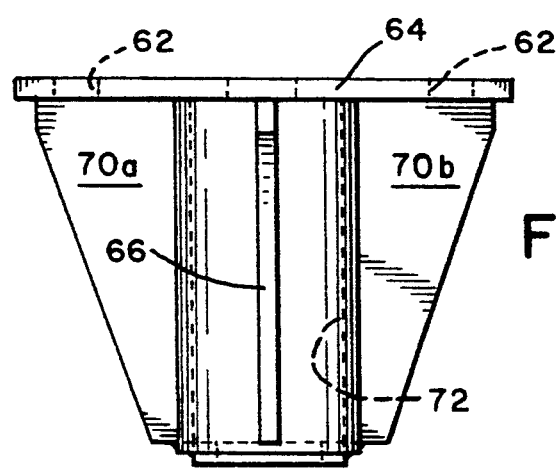
FIG. 7 is a top view taken along line 7—7 of FIG. 5.

Referring to FIGS. 1a, 2 and 3, the present invention provides a carriage wheel and rail track arrangement so as to allow cover 4 to rotate. Rail track 54 is attached to rail track mounting plate 56 via locking nuts 58. Plate 56 is rigidly attached to mounting plate support members 60 which are rigidly attached to top end 51 of tank wall 12. In a preferred embodiment, supports 60 are embedded in the concrete of wall 12 at least 24 inches. A plurality of flanged carriage wheels 50 are rotatably attached to corresponding carriage wheel axle support brackets 52 and are drivingly engaged with rail track 54. Brackets 52 are equidistantly attached to the periphery of cover 4. Referring to FIGS. 5-7, bracket 52 has screw inlets 62 formed in top surface 64 for receiving screws (not shown) for securing bracket 52 to cover 4 (see FIG. 4). Gussets 66, 68, 70a and 70b are integrally formed upon surface 64 of bracket 52 and form bore 72 for receiving axle 55 (see FIG. 3). Referring to FIG. 3, locking nut 57 is positioned at outer end of axle 55 and secures carriage wheel 50 to axle 55. Carriage wheel housing 53 is removably secured to bracket 52 via screws 59. Housing 53 is also removably secured to axle 55 via screw 59 which is inserted into inlet 61 formed in the exposed end of axle 55.

Referring to FIGS. 11-13, drive ring 78 is attached to an end of V-shaped drive ring support member 76 which is attached to bracket 52. Drive ring 78 is positioned intermediate pinch wheel 80 and traction wheel 84. Pinch wheel 80 is rotatably mounted to one end of support arm 92 which pivots about drive pivot 94. Pivot 94 is attached to support plate 83. When activated, pinch wheel actuator 82 pulls support arm 92 toward drive ring 78 thereby causing pinch wheel 80 to be pressed up against drive ring 78. Actuator 82 can be of the spring loaded type, or can be an electronic actuator controlled by an external control signal received from a control unit (not shown). When pinch wheel 80 is pressed against drive ring 78, drive ring 78 becomes drivingly engaged with traction wheel 84 thereby rotating cover 4 in a clockwise direction (designated by arrow 37 in FIG. 2). Traction wheel 84 is driven by motorized planetary gear box 86 which is attached to support plate 83. Drive mechanism support post 85 is positioned adjacent to tank wall 6. Intermediate support member 90 is attached to post 85 and supports plate 83. Bottom end 88 of post 85 is attached to mounting plate 81 which is positioned upon and attached to ground surface 87.

Referring to FIG. 12, support plate 83 pivots about drive pivot 94 thereby allowing gear box 86, pinch wheel 80, actuator 82, drive wheel 84 and support arm 92 to move in a limited fashion indicated by arrow 89. Such limited movement allows drive mechanism 34 to consistently rotate cover 4 despite any horizontal eccentricities present in cover 4 and/or drive ring 78. Electric power is supplied to gear box 86 via cables that, in a preferred embodiment, are embedded within support post 85. Circular drive ring 78 is concentric with and attached to the periphery of cover 4 (see FIGS. 1 and 2) by brackets (not shown). The brackets allow for horizontal adjustment of drive ring 78 so as to ensure that drive ring 78 is concentrically aligned with the center of tank 6. Cover 4 can also be rotated in the counterclockwise direction. However, raking structure 7 must be realigned to an orientation conducive to a counterclockwise rotation. Alternatively, drive mechanism 34 can also be a pneumatic-type drive system or a linear motor.

Referring to FIGS. 1 and 1a, cover 4 is sealingly engaged to the upper and inner periphery of tank 6. Cover skirt 17 is positioned intermediate the periphery of cover 4 and bracket 52. Cover skirt 17 is freely movable between walls 39a, 39b of trough 14 which retains liquid medium 41. Cover skirt 17 is substantially submerged within liquid medium 41 so as to prevent foul air within the tank from escaping into the surrounding environment or atmosphere. In a preferred embodiment, the liquid medium 41 comprises water and a suitable anti-freeze solution so as to prevent the water from freezing. However, if the clarifier tank of the present invention is to be operated in a warm climate, the liquid medium may comprise only water.

Referring to FIGS. 8 and 9, raking structure 7 comprises vertical support connector 21, rake blade support arms 24, elongated metal rake blade 23 and rubber squeegee 22. Rake structure vertical support member 25 is removably attached and pivotally engaged to vertical support connector 21. Referring to FIGS. 8 and 10, pivotal joint 29 allows support arm 24, blade 23 and rubber squeegee 22 to pivot in the direction indicated by arrow 45 (see FIG. 8). Referring to FIG. 10, elongated metal rake blade 23 is attached to the bottom surface 43 of support arm 24. Support arms 24 are rigidly attached to lip 33 of connector 21. In a preferred embodiment, support arms 24 are welded to lip 33. Rubber squeegee 22 is removably attached to blade 23 via locking screw 27. Pivotal joint 26 allows support arm 24, blade 23 and squeegee 22 to pivot in the direction indicated by arrow 47. Pivotal joints 26 and 29 thereby enable support arm 24 to move in relation to the contour of tank bottom 15. Raking structures 7 are arranged in an echelon formation so that the entire surface area of bottom surface 15 of tank 6 will be covered by squeegees 22. Vertical support member 25 is removably attached to cover outer layer 44 and cover inner layer 46.

Figure 14:
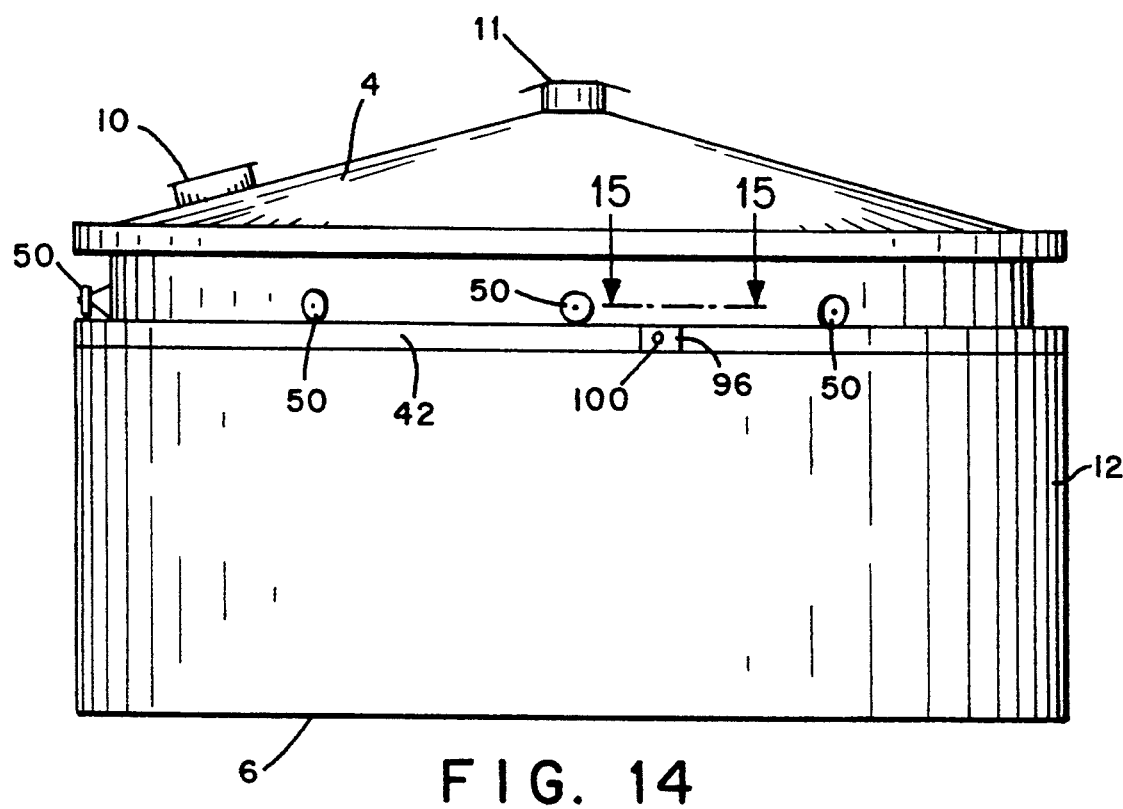
FIG. 14 illustrates the foul air extraction ring main utilized by the clarifier of the present invention.
Figure 15:
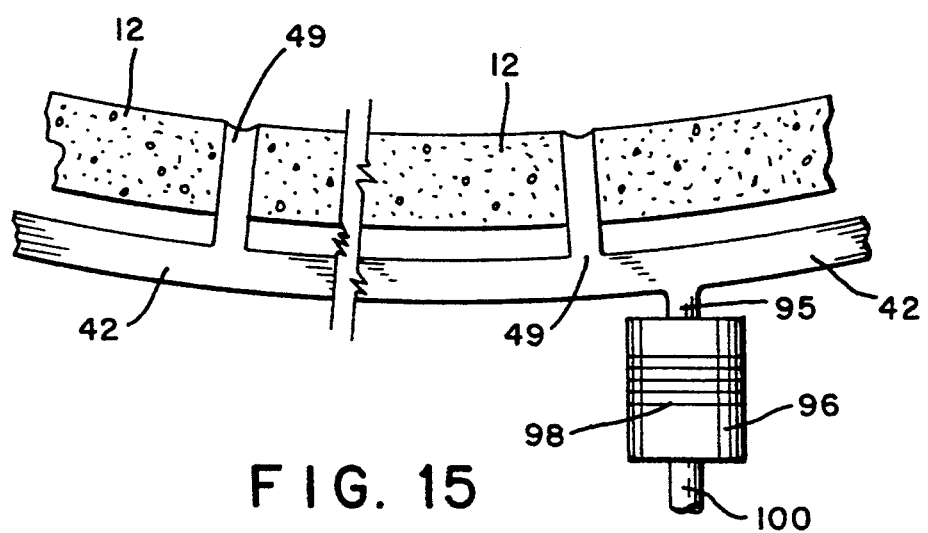
FIG. 15 is a top plan view taken along line 15—15 of FIG. 14.

The present invention also provides a system for extracting the foul air within the tank, purifying or filtering the foul air and then discharging the filtered or purified air into the surrounding environment or atmosphere. Referring to FIGS. 14 and 15, foul air extraction ring main 42 is attached to the upper periphery of wall 12 of tank 6 and has a plurality of equidistantly positioned openings 49 therein. Referring to FIG. 15, each of the openings 49 in ring main 42 is connected to the interior of tank 6 through wall 12. Air extraction unit 96 extracts air from ring main 42 though opening 95 in ring main 42. Unit 96 utilizes a filtering element 98 therein which filters the foul air which is extracted through openings 49 of ring main 42. In a preferred embodiment, filter 98 is a carbon filter. The carbon filter purifies the foul air before emitting it into the atmosphere or surrounding environment via outlet 100. The foul air extracted from the tank 6 is replaced by fresh air which is admitted into tank 6 by fresh air inlet 11. The fresh air from inlet 11 is uniformly distributed over the surface of the medium in tank 6 as a result of extracting foul air at equidistant locations about the periphery of tank 6.

During operation of clarifier 2 of the present invention, feed well 8, scum blade 35 and raking structures 7 rotate with cover 4. Feed well 8 receives raw feed liquor through opening 20 of conduit 18. Feed well 8 uniformly distributes the raw feed liquor throughout tank 6 so as to effect an efficient sedimentation process. Scum blade 35, scum box 28 and scum discharge port 31 cooperate to discharge from tank 6 any debris or matter floating upon the surface of the liquid medium in tank 6. Raking structures 7 are arranged in an echelon formation within tank 6 and thus, squeegees 22 cover the entire bottom surface 15 of tank 6 as cover 4 rotates. As the cover rotates, squeegees 22 sweep or rake settled solids toward the center of tank 6 and into sediment receiving depression or sump 16. The settled solids exit sump 16 via sludge underflow conduit 102. Throughout the rotation of cover 4, cover skirt 17 remains submerged in liquid medium 41 so as to effect a seal which prevents foul air within the tank from escaping into the surrounding environment or atmosphere. Air inlet 11, foul air extraction ring 42, foul air extraction unit 96 and filter 98 cooperate to provide a constant circulation of air into and out of tank 6 whereby fresh air is received by inlet 11 and filtered air is discharged from outlet 100.

Thus, the objects set forth above are achieved by the clarifier of the present invention which:

(a) utilizes a cover 4 that is rotatably and sealingly engaged to the upper and inner periphery of the clarifier tank 6 so as to prevent foul air within the clarifier tank from contaminating or permeating the environment surrounding the clarifier;

(b) utilizes a design configuration wherein feed well 8, influent conduit 8, scum blade 35 and raking structures 7 are supported by and rotate with cover 4;

(c) eliminates the need for a traction bridge, traction carriage, contactor column and center bearing; and (d) utilizes air extraction unit 96 and corresponding filter 98 which extract foul air from tank 6, filter the foul air and then discharge the filtered air into the surrounding environment or atmosphere.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. An apparatus for clarifying liquor, comprising:
 a tank;
 a cover positioned over said tank, said cover being rotatably and sealingly engaged with a marginal wall of said tank so as to prevent foul air within said tank from escaping into the atmosphere;
 an air inlet means on said cover;
 an influent supply means disposed within said tank, said supply means comprising a feed well being rotatable with and supported by said cover;
 means, on said tank, for extracting foul air from within the tank;
 means, on said tank, for filtering the foul air extracted from said tank and discharging the filtered air into the atmosphere;
 means for rotating said cover; and
 a plurality of rakes supported by and rotatable with said cover for raking settled solids toward the center of said tank and into a sediment discharge sump of said tank.

2. The apparatus of claim 1 further including a scum blade supported by said cover and attached to and rotatable with said influent supply means for skimming the surface of the medium in said tank.

3. The apparatus of claim 1 further including;
 a track formed on the top end of said marginal wall;
 a plurality of flanged carriage wheels attached to the periphery of said cover and drivingly engaged with said track; and a ring means concentric with and attached to the periphery of said cover, said ring means being drivingly engaged with said rotating means so as to rotate said cover.

4. The apparatus of claim 1 wherein said rotating means comprises a pneumatic drive means.

5. The apparatus of claim 1 wherein said rotating means comprises a linear motor.

6. The apparatus of claim 1 further including:
a trough attached to the inner periphery of said tank, said trough containing a liquid medium therein; and
a skirt attached to the periphery of said cover and at least partially submerged within the liquid medium in said trough, said skirt being movable within the confines of said trough.

7. The apparatus of claim 1 wherein said cover is coated with a fabric.

8. The apparatus of claim 7 wherein said fabric is comprised of polyvinylchloride.

9. The apparatus of claim 1 further including:
a hatch in said cover for allowing access into said tank; and
a viewing port in said cover for allowing observation within said tank during operation of said clarifier.

10. The apparatus of claim 1 wherein said extraction means comprises:

a plurality of air outlets equidistantly positioned on said marginal wall of said tank; and said filtering means comprises
at least one filter means for filtering the foul air received from said plurality of air outlets and discharging the filtered air into the atmosphere.

11. The apparatus of claim 10 wherein said filter means comprises a carbon-type filtering element.

12. An apparatus for clarifying liquor, comprising:
a tank;
a cover positioned over said tank, said cover being rotatably and sealingly engaged with a marginal wall of said tank so as to prevent foul air within said tank from escaping into the atmosphere;
an air inlet on said cover;
a feedwell disposed within said tank, said feed well being rotatable with and supported by said cover;
a foul air extractor on said tank for extracting foul air from within the tank;
a filter for filtering the foul air extracted from said tank and discharging the filtered air into the atmosphere;
a drive mechanism for rotating said cover; and
a plurality of rakes supported by and rotatable with said cover for raking settled solids toward the center of the tank and into a sediment discharge sump of said tank.

* * * * *